UNITED STATES PATENT OFFICE.

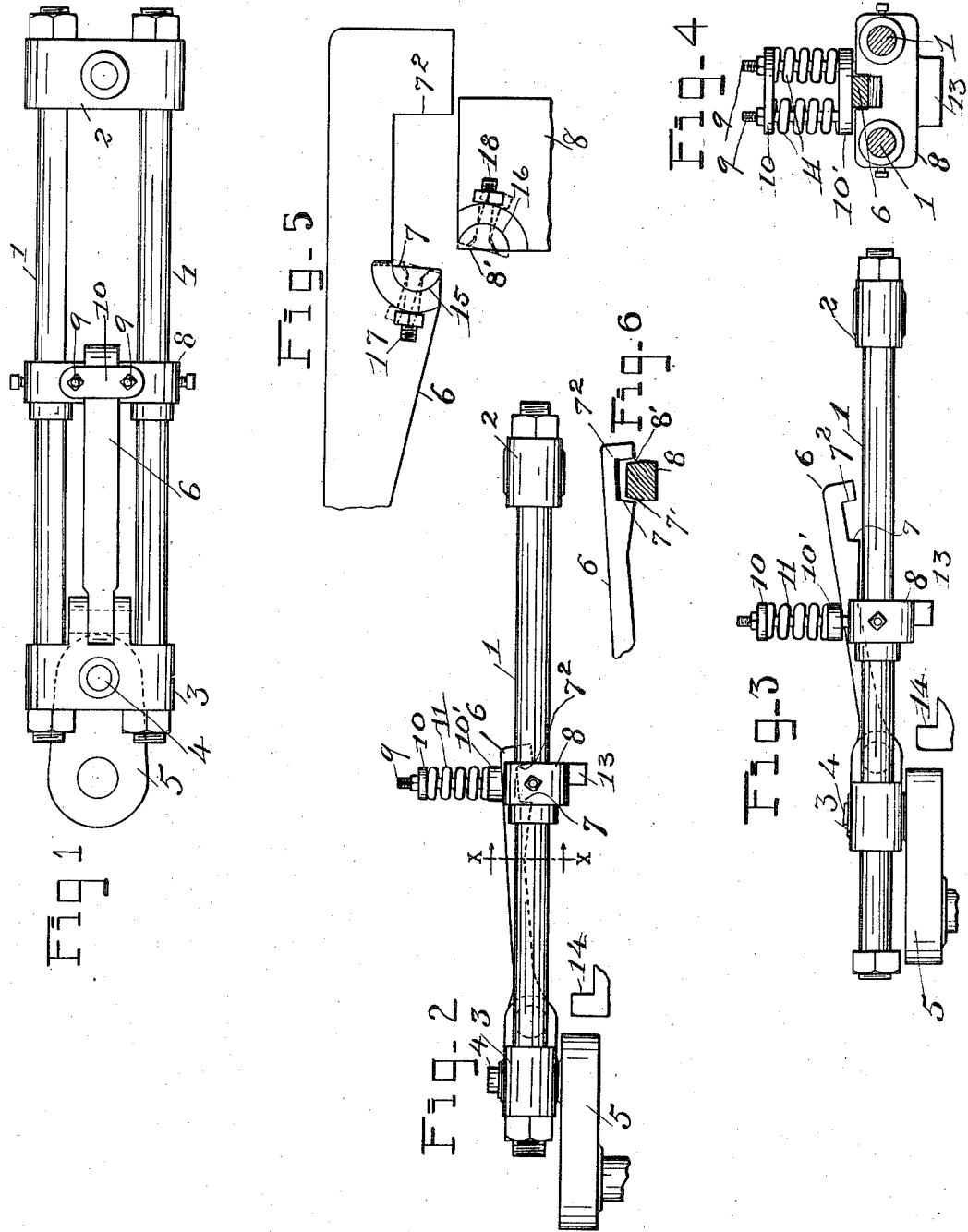

DANIEL J. C. ARNOLD, OF NEW LONDON, OHIO.

PRESSURE-RELEASING DEVICE.

1,063,002.   Specification of Letters Patent.   Patented May 27, 1913.

Application filed September 21, 1911. Serial No. 650,489.

*To all whom it may concern:*

Be it known that I, DANIEL J. C. ARNOLD, a citizen of the United States, and resident of New London, in the county of Huron and State of Ohio, have invented certain new and useful Improvements in Pressure-Releasing Devices, of which I hereby declare the following to be a full, clear, and exact description, such as will enable others skilled in the art to which it appertains to make and use the same.

The objects of the invention are to provide means for obtaining release under heavy pressure of the actuating parts of a machine, such as the connecting rod, or other appliance employed to transmit movement and power to the operating parts of a machine, and the device is specifically provided to relieve such driving member when the machinery becomes clogged or when heavy pressure is otherwise placed upon the driving member such that if not released it would soon become broken. It is particularly applicable for employment in all classes of machinery where the work necessitates heavy pressure, and which are liable to injury when worked beyond the power of the actuating means. Particularly in such classes of machinery as brick machines, hay presses, and analogous devices.

The invention comprises a connecting rod, one portion of which is slidable within or upon another portion and a connecting means between the two portions which detachably secures them together until an excess of pressure is encountered beyond the predetermined computed strength of this device, whereupon the connecting means between the parts is automatically released and the parts slide upon each other without transmitting any movement whatsoever. The device also includes means for reconnecting these parts in an operative manner at one end of the stroke so that the machinery will operate as soon as the obstruction is removed.

The invention specifically comprises a latching member upon one portion provided with a shoulder adapted to engage a corresponding shoulder upon the other portion of the connecting rod. These shoulders have faces inclined at an angle such that the latching member will be cast off when a predetermined amount of pressure is exceeded.

The invention also includes tension springs adapted to engage the latching member and means for adjusting the pressure upon the spring.

Further features of the invention comprise means for adjusting the angular positions of the said engaging shoulders upon the latching member and connecting rod.

The invention further consists in the combination and arrangement of the various parts and construction of details as hereinafter described, shown in the accompanying drawings and specifically pointed out in the claims.

In the accompanying drawings Figure 1 is a plan view of the improved form of connecting rod showing a member or head in which the connecting rod is slidingly mounted, said head being operatively connected with the crank; Fig. 2 is a side elevation of the same showing a latching member engaging the cross bar upon the connecting rod, pressure applying springs and adjusting nuts therefor; Fig. 3 is a side elevation of the same showing the rod released by pressure from the cross bar of the connecting rod; Fig. 4 is a transverse section of the connecting rod showing the latch in position; Fig. 5 is an enlarged view of the outer end of the latch showing adjustable shoulders upon the latch and cross bar.

In these views 1, 1 are the parallel rods of a connecting rod; 2 is a cross bar to which the outer ends of the rods are secured; 3 is a cross bar in which the crank pin 4 of the crank 5 operates. The bars 1, 1 of the connecting rod are slidably inserted in the cross bar 3. Upon the cross bar 3 is pivotally secured an elongated latching member 6 which is provided with a shoulder 7 near its outer extremity which is slightly inclined a few degrees from a vertical plane and engages a corresponding shoulder 7' upon a cross bar 8 secured to the rods 1, 1. On the forward stroke of the rod it is also provided with the oppositely facing shoulder $7^2$ which engages the bar 8 on the return stroke.

9, 9 are studs inserted in the cross bar 8, and 10, 10', are plates through which the studs pass and which are separated by the coil springs 11, 11. The lower plate 10' rests upon the latching member and by means of nuts 12, 12 engaging the upper plate 10 the amount of pressure upon the latching member can be adjusted.

As shown in Fig. 3 when the resistance to the connecting rod on the outer stroke exceeds the predetermined limit the inclined shoulders mentioned permit the latching member to rise against the pressure of the springs and the rods 1, 1 to slide in the cross head 3 thus relieving the pressure. On the return movement of the connecting rod a lug 13 from the cross bar 8 engages a shoulder 14 upon a stationary portion of the bed plate of the machine and holds the connecting rods stationary until the crank has drawn the cross bar 3 and latching member back into the engaging position shown in Figs. 1 and 2.

In Fig. 5 the engaging shoulders shown are formed with semi-cylindrical bearings 15 and 16 and these bearings are slotted to permit the adjustment of studs 17 and 18 to regulate the angle of elevation of each shoulder. The opposite shoulders 8' can be made without adjustment if desired. When lubrication is employed this angle is less than when the surfaces are not lubricated and the shoulders can be adjusted to release the latching member when any excess of pressure beyond the desired limit is encountered.

It is obvious that this releasing means is applicable to many forms of transmitting devices or elements for power producing machinery, the essential features of the invention being the formation of the element in two parts slidable on each other, a latch capable of lifting and attached to one of the elements, engaging shoulders on said latch and the other portion of the element on a plane inclined to a plane at right angles to the direction of movement of the parts.

Having described the invention what I claim as new and desire to secure by Letters Patent is:

1. In a connecting rod, in combination with a crank and crank pin, a cross bar through which the pin extends, a pair of rods connected together at the outer ends and slidable in said first mentioned cross bar, a cross bar connecting the said rods together intermediate of their lengths, said bar provided with inner and outer shoulders, a latch bar pivoted in said crank pin bar and provided with a recess provided with shoulders engaging the shoulders on said intermediate cross bar and a device for resiliently retaining the said latch bar in engagement with said intermediate cross bar.

2. In combination with a crank and crank pin, a cross bar pivoted on said crank pin, parallel rods slidable in said pivoted cross bar and connected together at their outer ends, a latch bar pivoted in said pivoted cross bar and provided with a shouldered recess in its outer end, a transverse bar connecting said parallel rods, and engaged by the shoulders on said latch bar, one of the shoulders in said latch bar being inclined and the corresponding shoulder in the transverse bar having a corresponding inclination, a spring on each side of said latch bar and retaining means therefor secured in said transverse bar.

3. The combination with a crank and crank pin, of a cross bar pivoted on said crank pin, a pair of spaced rods movable in said pivoted cross bar and secured together at their outer ends, a latch bar pivoted in said pivoted cross bar, a transverse bar intermediate of the length of said rods, and provided with engaging shoulders and said latch bar provided with corresponding shoulders, springs on said transverse bar tending to retain said shoulders on said latch and cross bar in engagement and means for returning the latch bar to its normal position.

4. The combination with the frame, crank, and crank pin, of a cross bar pivoted on said crank pin, a pair of rods slidable in said cross bar and connected together at the outer end, a latch bar pivoted in said pivoted cross bar and provided with a front and a rear shoulder, a transverse bar rigidly connecting said rods, and provided with corresponding shoulders, a third shoulder on said transverse bar and a corresponding shoulder on the frame.

In testimony whereof, I hereunto set my hand this 6th day of Sept., 1911.

DANIEL J. C. ARNOLD.

In presence of—
E. M. PALMER,
C. L. RERICK.